(12) United States Patent
Herriott et al.

(10) Patent No.: US 9,425,976 B2
(45) Date of Patent: Aug. 23, 2016

(54) REPORTING OPERATIONAL INFORMATION OF A NETWORK DEVICE

(75) Inventors: Guy Herriott, Placerville, CA (US); Sundeep Nagra, Roseville, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 1613 days.

(21) Appl. No.: 12/544,012

(22) Filed: Aug. 19, 2009

(65) Prior Publication Data
US 2011/0044182 A1 Feb. 24, 2011

(51) Int. Cl.
*H04L 12/26* (2006.01)

(52) U.S. Cl.
CPC ..................... *H04L 12/26* (2013.01)

(58) Field of Classification Search
CPC ....................................................... H04L 12/26
USPC ......... 370/252, 241; 709/223, 224, 225, 226
See application file for complete search history.

(56) References Cited

U.S. PATENT DOCUMENTS

| | | | |
|---|---|---|---|
| 6,480,901 B1 * | 11/2002 | Weber et al. | 709/246 |
| 7,319,671 B1 | 1/2008 | Mohan | |
| 7,346,678 B1 * | 3/2008 | Zhu et al. | 709/224 |
| 7,363,360 B2 * | 4/2008 | Miller et al. | 709/223 |
| 7,552,238 B2 * | 6/2009 | Gulland | 709/248 |
| 7,580,996 B1 * | 8/2009 | Allan et al. | 709/224 |
| 7,779,119 B2 * | 8/2010 | Ginter et al. | 709/224 |
| 2004/0143651 A1 * | 7/2004 | Allen et al. | 709/221 |
| 2005/0152300 A1 * | 7/2005 | Edsberg | 370/316 |
| 2006/0280150 A1 * | 12/2006 | Jha et al. | 370/338 |
| 2007/0113273 A1 * | 5/2007 | Shafer et al. | 726/11 |
| 2008/0056161 A1 * | 3/2008 | Okita et al. | 370/254 |
| 2008/0109568 A1 | 5/2008 | Rengarajan et al. | |
| 2008/0225720 A1 * | 9/2008 | Khemani et al. | 370/235 |
| 2008/0235357 A1 * | 9/2008 | Gustafsson | 709/220 |
| 2009/0183029 A1 | 7/2009 | Bethke et al. | |

* cited by examiner

*Primary Examiner* — Chi H Pham
*Assistant Examiner* — Robert Lopata
(74) *Attorney, Agent, or Firm* — Hewlett Packard Enterprise Patent Department

(57) ABSTRACT

A method for reporting operational information in a network is described herein. The network may include a network device and a network management server. The network device may detect an event triggering reporting of a modification to a configuration of the network device. A report message initiated by the network device may be provided. The report message may identify the modification to the configuration. The modification to the configuration may be committed after providing the report message. In another embodiment, the network device detects an event indicating a performance condition in the network device. A report message initiated by the network device is generated. The report message may include a state of the network device at the time of the event.

18 Claims, 5 Drawing Sheets

REPORTING OPERATIONAL INFORMATION OF A NETWORK DEVICE

I. BACKGROUND

In conventional network computing environments, a number of devices are used to interconnect computing systems to efficiently transfer data over the network. In large-scale implementations, hundreds or thousands of network devices are deployed to interconnect the computing systems.

Troubleshooting a disruption in a large-scale and complex system can be difficult. For example, a host may experience connectivity issues or the flow of traffic between a segment in the network may be slow. There may be many different possible causes of these and other network disruptions, and discovering the root cause can be an arduous task. The troubleshooting process becomes increasingly intractable and time consuming as the systems become larger and more complex.

Specialized computer systems such as network management systems are dedicated to monitoring the status of network devices and the health of the network as a whole, and the information gathered may be used for troubleshooting as network disruptions arise. A network management system, which is a system attached to the network, gathers information about the topology of the network, the operational status of network devices and the interconnection among them, performance statistics of various segments of the network, and attempts to identify potential trouble spots in the network.

The network management system typically gathers this information by periodically polling network devices in the network. In large-scale network implementations, polling and monitoring of every device often requires a significant portion of network bandwidth and can cause inefficiencies in the network.

II. BRIEF DESCRIPTION OF THE DRAWINGS

The present disclosure may be better understood and its numerous features and advantages made apparent to those skilled in the art by referencing the accompanying drawings.

III. DETAILED DESCRIPTION OF THE INVENTION

In one embodiment, operational information of a network device may be reported in a "push" manner, such that reports of the operational information about the network device are initiated by the network device as events are detected. The report messages are triggered upon detection of events in the network device, and as such, repeated querying or polling of each network device may be avoided. The report message may be used by the network management server for troubleshooting a disruption in the network.

A method for reporting operational information in a network is described. As used herein, operational information includes state information of the network device, event logs, configuration, error, and health information, counters, packet and protocol statistics, etc. Upon detecting an event such as a configuration change, a network device generates a report that contains the operational information of the device. The report message, which is initiated by the network device, may identify the modification of the configuration. The modification of the configuration is committed in the network device after providing the report message.

In another embodiment of reporting operational information in a network, a network device detects an event indicating a performance condition in the network device. A report message which is initiated by the network device is generated which includes the state of the network device. The reporting of the state of the network device may be at the time of the detected event. Moreover, the state information that is reported is the state of the network at the time of the detected event. The report message may be sent, for example, to a network management server.

Figure 1:
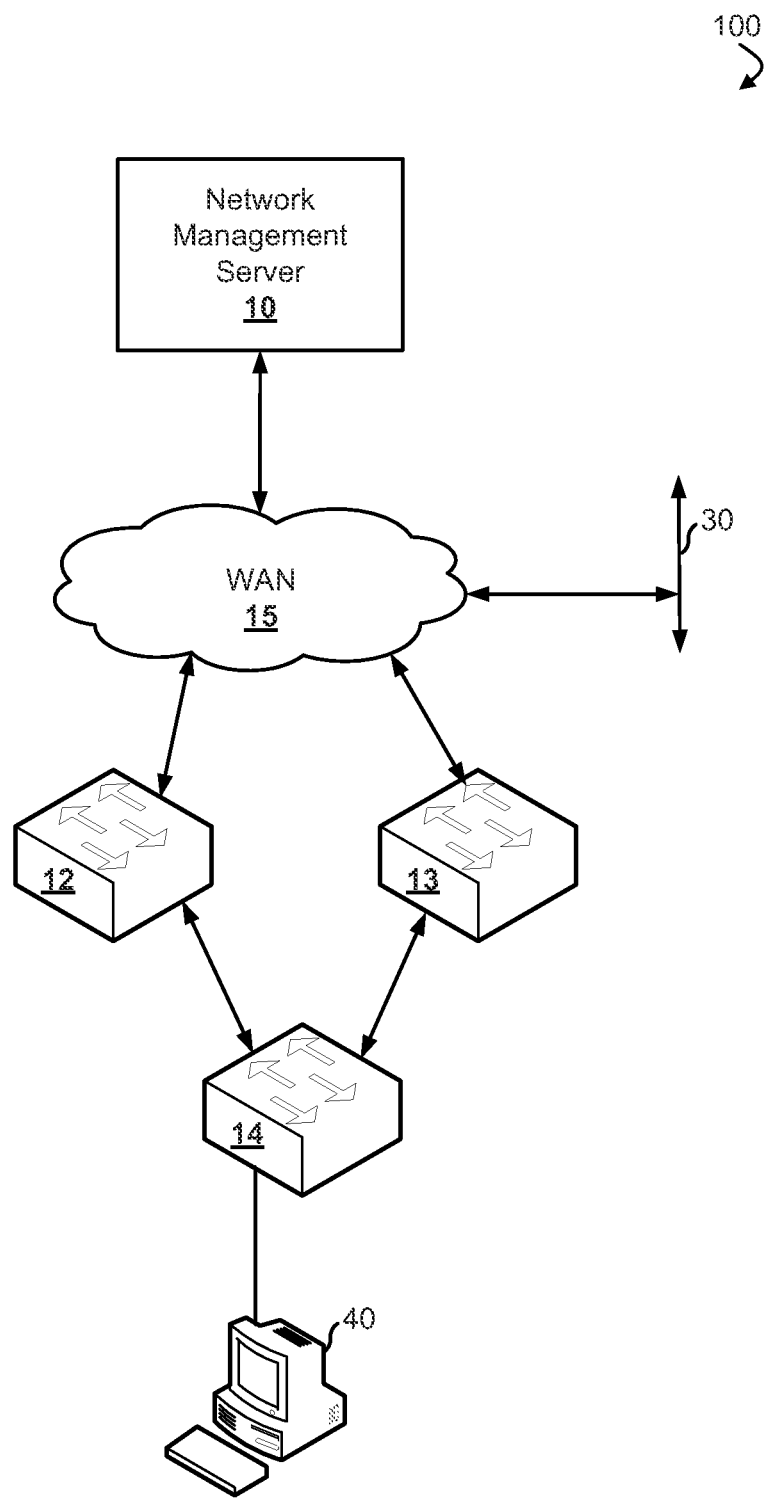
FIG. 1 is topological block diagram of a network system in accordance with an embodiment of the invention.

FIG. 1 is topological block diagram of a network system 100 in accordance with an embodiment of the invention. System 100 includes a network management server 10, wide area network (WAN) 15, a network switch 12, a network switch 13, a network switch 14, a local area network (LAN) 30, and a host 40.

Network management server 10 is configured to manage, monitor, and/or deploy a network. Network manager 10 is operatively coupled to network switches 12-14 via WAN 15. The connection between network management server 10 and network switches 12-14 may include multiple network segments, transmission technologies and components.

LAN 30 is operatively coupled to WAN 15. LAN 30 is implemented by one or more network switches and/or other network devices, such as a bridge. LAN 30 may be a LAN, LAN segments implemented by an Ethernet switch or an array of switches having multiple ports.

Network switch 12 is operatively coupled to network management server 10 via WAN 15. Network switch 12 includes multiple ports, one of which connects to network switch 14. Network switch 13 is operatively coupled to network management server 10 via WAN 15. Network switch 13 includes multiple ports, one of which connects to network switch 14.

Network switch 14 is operatively coupled to network switch 12 and network switch 13. Network switch 14 includes multiple ports, one of which is connected to host 40. Network switch 14 is an edge device. As used herein, an edge device is a network switch, router, or other network device on the edge of a network. Host devices connect directly to the edge device via an edge port. As used herein, an edge port is a port of an edge device.

In one embodiment, network switch 12, network switch 13, and network switch 14 are configured to process and transfer data in a network. Additionally, network switch 12, network switch 13, and/or network switch 14 may be under the purview and control of network management server 10 and are configured to detect an event occurring in the network device and provide a report message initiated by the network device. The report message may be used by network management server 10 for troubleshooting and other purposes.

In operation, an event occurring within a network device may be detected by the network device and a message about the event may be sent to network management server 10. The message may be pushed or initiated by the network device itself. Where the event is a configuration modification, the message about the modification is initiated by the network device, which is different from conventional methods in which network management server 10 polls network devices for information.

For example, host 40 may modify a configuration of network switch 14. Network switch 14 is configured to detect the modification, provide to network management server 10 a report message, for example, about the configuration modification, and commit the configuration change after providing the report message. Network switch 14 is configured to be the initiator of the report message. In one embodiment, the configuration change itself may cause a disruption in the network after the change is committed. By sending the report message to network management server 10 before committing the configuration change, network management server 10 is notified of a potential cause of the network disruption before the potential disruption actually occurs.

In another example, network switch 14 is configured to detect an event indicating a performance condition in network switch 14, generate a report message including a state of network switch 14 at a time of the event, and provide to network management server 10 the report message. Moreover, network switch 14 is configured to be the initiator of the report message.

In one embodiment, the report message includes an identification of the network switch that generated and/or sent the message. As such, the network management server 10 knows where the report message came from within the network. For example, the source IP address of the report message is the IP address of network switch 14.

The present invention can also be applied in other network topologies and environments. Network 100 may be any type of network familiar to those skilled in the art that can support data communications using any of a variety of commercially-available protocols, including without limitation TCP/IP, SNA, IPX, AppleTalk, and the like. Merely by way of example, network 100 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

Figure 2:
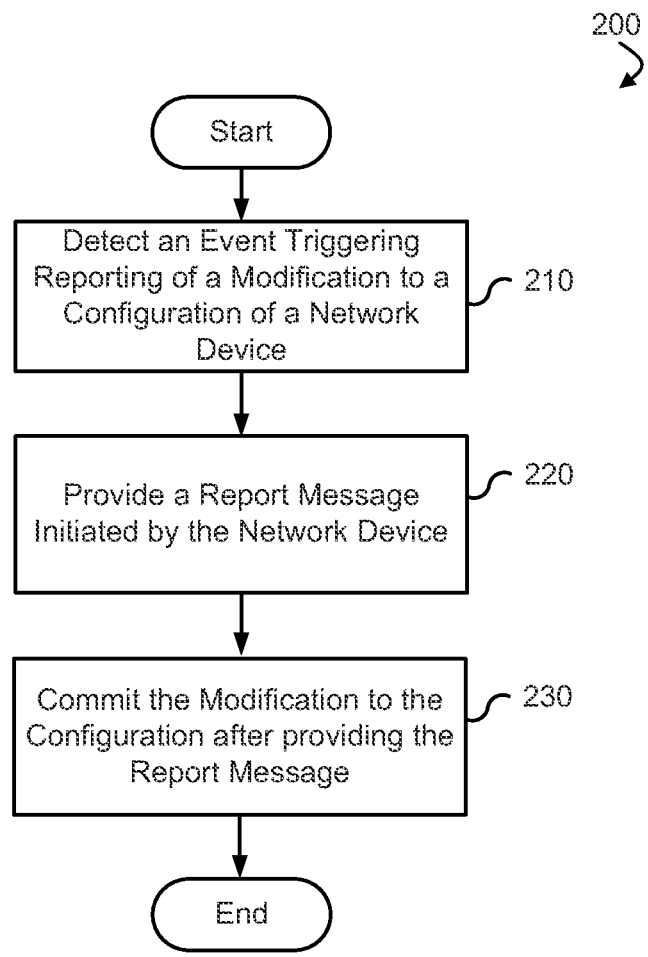
FIG. 2 is a process flow diagram for reporting a configuration change in accordance with an embodiment of the invention.

FIG. 2 is a process flow diagram for reporting a configuration change in accordance with an embodiment of the invention. The depicted process flow 200 is carried out by execution of one or more sequences of executable instructions. In another embodiment, the process flow 200 is carried out by execution of components of a network device, an arrangement of hardware logic, e.g., an Application-Specific Integrated Circuit (ASIC), etc.

In a network having one or more network devices under common management and control, the network device may push a report message, for example, to a network management server.

At step 210, an event triggering the reporting of configuration modifications may be detected. In one embodiment, the event is detecting a modification to a configuration of a network device. The configuration may include, but is not limited to, communication and/or security protocols, keys, passwords, bandwidth usage and allocation, number or type of devices communicating with the network device, interface settings, assigned IP addresses, next-hop router, etc. In one embodiment, any changes to the configuration may be monitored. In another embodiment, specific modifications, such as those which may cause network-related issues may be monitored.

As understood by those skilled in the art, network devices, such as network switches and routers, may maintain two configuration files: a running configuration and a startup configuration. The startup configuration is typically the saved configuration and is used during boot-up of the network device. In one embodiment, the startup configuration is stored in the flash memory of the network device. After boot-up, the start-up configuration may be used as the running configuration, for example in volatile memory. Configuration changes are made to the running configuration in volatile memory. Modifications to the configuration may be made through a command line interface, simple network management protocol (SNMP) instruction, a remote monitoring (RMON) action, an applet, and the like for interfacing with the network device. As such, in one embodiment, changes to the running configuration may be monitored.

In another embodiment, the event that triggers reporting of the modification to the configuration of the network device is an indication of a reporting timer. For example, one or more changes to the running configurations may be reported in a periodic manner.

A report message initiated by the network device is provided, for example, to the network management server, at step 220. The report message may be pushed or otherwise initiated by the network device upon detection of the event. In one embodiment, the report message may be sent using a file transfer protocol (FTP), trivial file transfer protocol (TFTP), secure file transfer protocol (SFTP), SNMP, or some other transfer protocol including information about the configuration modification(s). For isolated or small configuration changes, the report message may be a SNMP message. The message may include the running configuration file or any portion thereof. In one embodiment, the difference between a current running configuration and a previous running configuration or a difference between the running configuration and the startup configuration (referred to herein as "delta configuration") are provided. During troubleshooting, a network administrative entity may use the delta configuration as a starting point for determining the root cause of a network disruption.

In another embodiment, one or more of the command-line instructions, SNMP instructions, RMON actions, other instructions, or the implemented results of those instructions may be provided in the report message. For example, a host may send a command-line instruction to alter the assigned IP address of the network device. The report message may include the newly assigned IP address. In yet another embodiment, the report message may include a copy of the previous running configuration or the startup configuration, which may indicate a last known valid configuration. During troubleshooting, the network administrative entity may reinstate the last known valid configuration, for example, if the modification was the cause of the network disruption. Furthermore, performance and/or state information about the network device may also be provided as a part of the report message.

As such, events may be detected and the report message may be pushed without initiation by, for example, a network management server.

At step 230, the modification to the configuration is committed after providing the report message. As previously described, configuration changes may be made to the running configuration in volatile memory. Any changes made while the network device is working are immediately reflected in the running configuration. When the running configuration is committed, saved, or otherwise made permanent, the running configuration may replace the startup configuration.

In one embodiment, the modifications reflected in the running configuration are committed subsequent to providing the report message. The modifications to the network device configuration may be a root cause of the network disruption. It is possible that the network disruption may render the network device unreachable, and as such, collecting data from the network device to troubleshoot the disruption may not be possible. By committing the modifications to the network device configuration after providing the report message and while the network device is reachable, the information about any modifications made may be accessible by the network management server, even if the network device is no longer reachable after committing the modifications.

Figure 3:
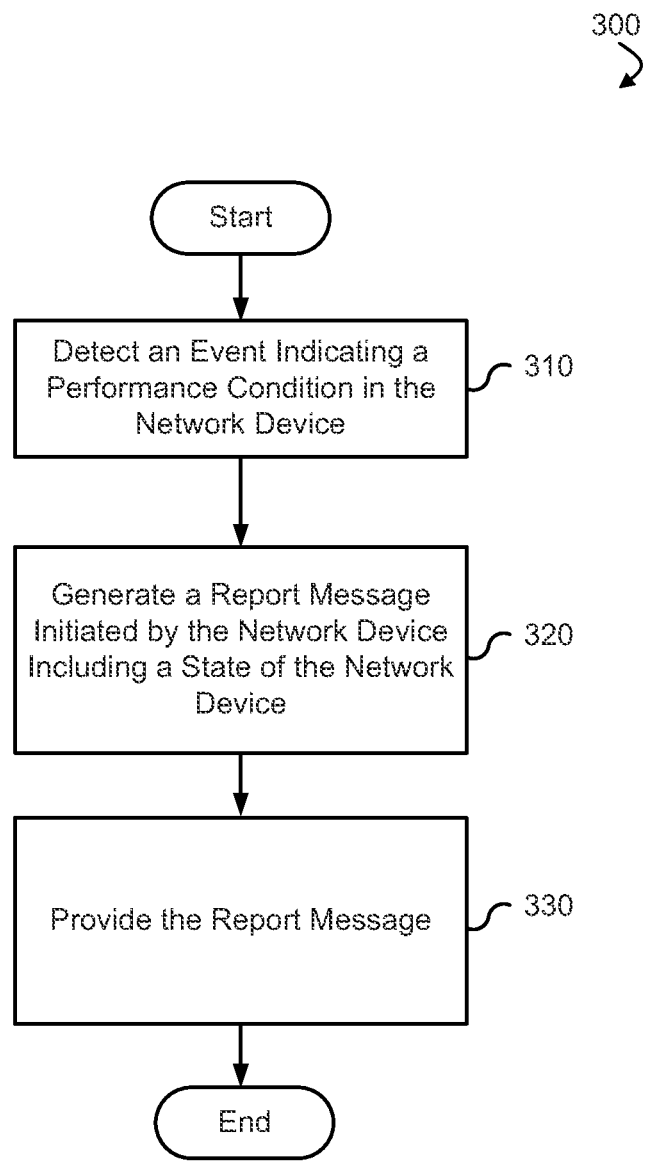
FIG. 3 is a process flow diagram for reporting a state of a network device in accordance with an embodiment of the invention.

FIG. 3 is a process flow diagram for reporting a state of a network device in accordance with an embodiment of the invention. The depicted process flow 300 is carried out by execution of one or more sequences of executable instructions. In another embodiment, the process flow 300 is carried out by execution of components of a network device, an arrangement of hardware logic, e.g., an Application-Specific Integrated Circuit (ASIC), etc.

In a network having one or more network devices under common management and control, the network device may push a report message, for example, to a network management server. The report message may include information about a detected event and device state information, which is different from conventional methods in which SNMP traps and syslog messages are sent including only a small amount of information about the event. The information sent, for example, in an SNMP trap may provide little to assist a network administrative entity to isolate the root cause of a network disruption.

At step 310, an event indicating a performance condition in the network device is detected. In one embodiment, performance metrics or performance parameters about the network device may be monitored and/or collected, for example, by the network device. Performance parameters may include memory usage, switch efficiency, processor load, free memory, protocol statistics, counters, bandwidth utilization, traffic patterns, etc. The event which indicates a performance condition may include determining that the performance parameter has exceeded a threshold. For example, if bandwidth usage of a port that is part of the network switch has increased beyond a tolerable threshold, an alert may be triggered, indicating that the network switch is overwhelmed and that the network may be experiencing a broadcast storm.

A report message initiated by the network device may be generated at step 320. The report message may be sent using a file transfer protocol (FTP), trivial file transfer protocol (TFTP), secure file transfer protocol (SFTP), SNMP, or some other transfer protocol including information about the state of the network device. Typically, limited information about the event may be provided. For example, system logs (syslogs) may include only a switch identifier, the time that the event occurred, and minimal text about the event. Often, syslog information is insufficient for troubleshooting purposes. In one embodiment, the report message includes state information about the network device. Device state may include in-depth device, interface, memory, I2/I3 table, statistic, counter, and other information kept by the network device. For example, a technical support (showtech) file which includes much of the network device's state may be included in the report message. In addition to device state, event information also may be included.

The report message may be limited to the device state at or near the time of the detected event. In one embodiment, information about the state of the network device before the time of the event may be included. The device state spanning a time from closely preceding to closely following the time of the event may be included.

The report message initiated by the network device is provided, for example, to the network management server, at step 330. The report message may be pushed or otherwise initiated by the network device as events are detected within the device and by the device. The report message may be used by the network management server for diagnosing issues of the network. As such, events may be detected and the report message may be pushed without initiation by a controlling authority.

Figure 4:
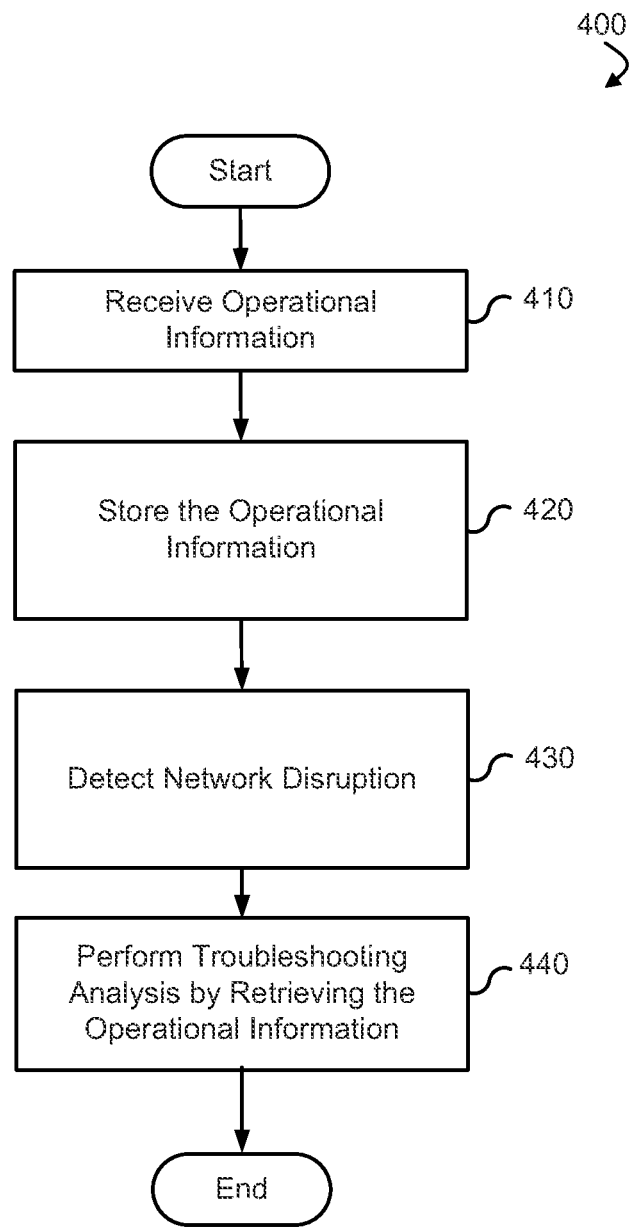
FIG. 4 is a process flow diagram for performing troubleshooting analysis in accordance with an embodiment of the invention.

FIG. 4 is a process flow diagram for performing troubleshooting analysis in accordance with an embodiment of the invention. The depicted process flow 400 is carried out by execution of one or more sequences of executable instructions. In another embodiment, the process flow 400 is carried out by execution of components of a network node, an arrangement of hardware logic, e.g., an Application-Specific Integrated Circuit (ASIC), etc.

In a network having one or more network devices under common management and control, for example, by a network management server, troubleshooting analysis may be performed by the network management server to address an anomaly or disruption to the network.

At step 410, operational information about the network device under common control may be received. The operational information may be stored at step 420. A network disruption may be detected at step 430.

At step 440, troubleshooting analysis may be performed by retrieving the operational information. Various tools may be used in troubleshooting a complex network exhibiting symptoms of an anomaly or a disruption. Unlike typical solutions which query the devices in the network for event information, the operational information is retrieved, for example from storage on the network management server.

In one embodiment, operational information that has an associated time stamp before a time the disruption was detected may be retrieved. Moreover, operational information of a network device in a location of the disruption may be retrieved. Other aspects of the operational information may be used to provide more targeted information for troubleshooting. Analysis may be performed using the retrieved operational information. For example, filtering according to similar symptoms, correlating symptoms with known causes, learning patterns of symptoms, or other similar analyses may be performed.

Figure 5:
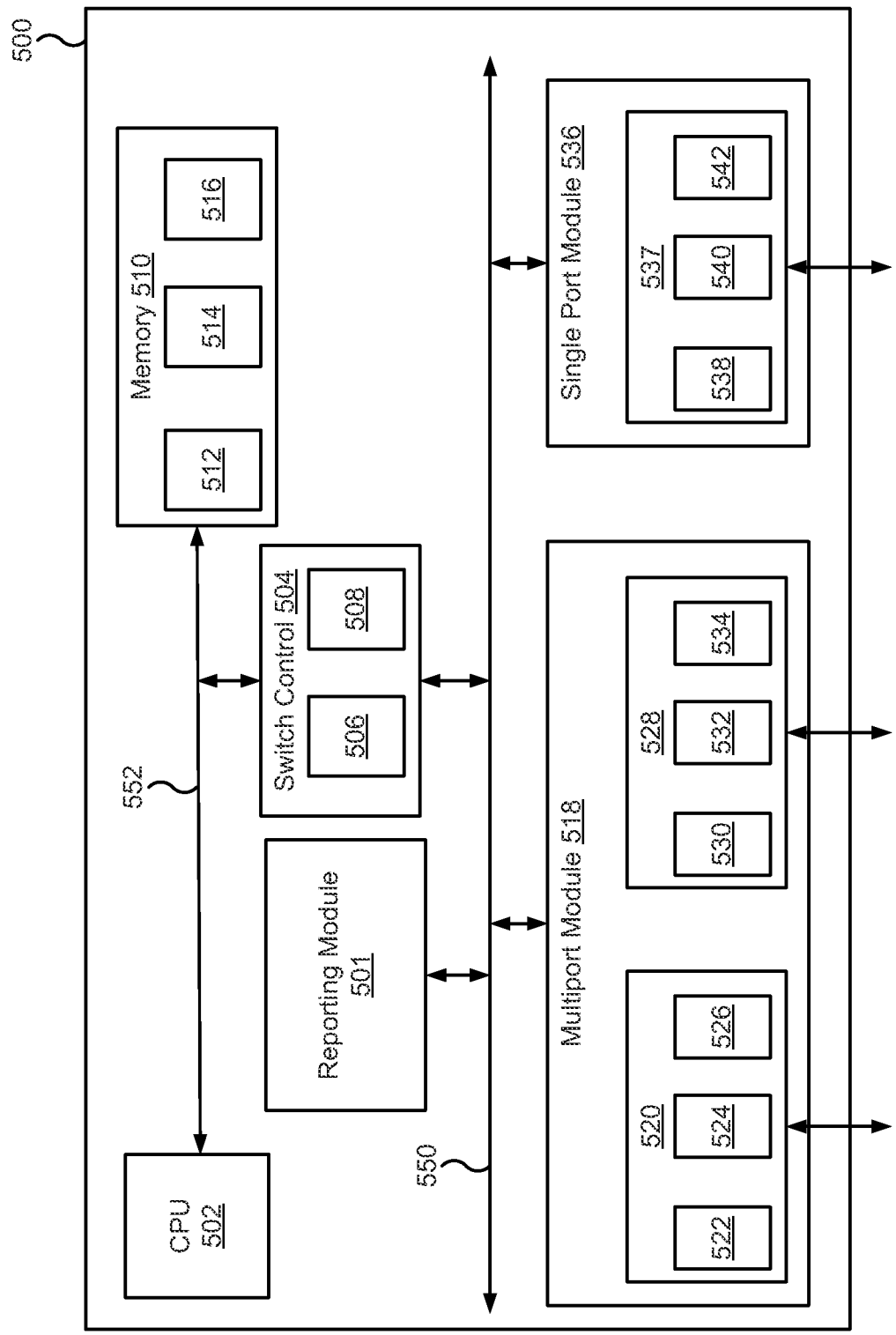
FIG. 5 is a block diagram of an exemplary packet switch in accordance with an embodiment of the invention.

FIG. 5 is a block diagram of an exemplary packet switch 500 in accordance with an embodiment of the invention. The specific configuration of packet switches used may vary depending on the specific implementation. A central processing unit (CPU) 502 performs overall configuration and control of the switch 500 in operation. The CPU 502 operates in cooperation with switch control 504, an application specific integrated circuit (ASIC) designed to assist CPU 502 in performing packet switching at high speeds.

The switch control 504 controls the "forwarding" of received packets to appropriate locations within the switch for further processing and/or for transmission out another switch port. Inbound and outbound high speed FIFOs (506 and 508, respectfully) are included with the switch control 504 for exchanging data over switch bus 550 with port modules. In accordance with an embodiment of the invention, switch control 504 is an ASIC and is configured to detect performance issues. In particular, switch control 504 is configured to detect an event indicating a performance condition in the network device. Switch control 504 may be further configured to detect an event triggering reporting of a modification to a configuration of the network device.

Memory 510 includes a high and low priority inbound queue (512 and 514, respectively) and outbound queue 516. High priority inbound queue 512 is used to hold received switch control packets awaiting processing by CPU 502 while low priority inbound queue 514 holds other packets awaiting processing by CPU 502. Outbound queue 516 holds packets awaiting transmission to switch bus 550 via switch control 504 through its outbound FIFO 508. CPU 502, switch control 504 and memory 510 exchange information over processor bus 552 largely independent of activity on switch bus 550.

Reporting module 501 is configured to initiate a report including operational information of the network device as events are detected. In one embodiment, reporting module 501 is further configured to provide a report message which may include information about a modification to a configuration of switch 500. In another embodiment, reporting module 501 is further configured to generate a report message including information about the state of switch 500.

The ports of the switch may be embodied as plug-in modules that connect to switch bus 550. Each such module may be, for example, a multi-port module 518 having a plurality of ports in a single module or may be a single port module 536. A multi-port module provides an aggregate packet switch performance capable of handling a number of slower individual ports. For example, in one embodiment, both the single port module 536 and the multi-port module 518 may be configured to provide, for example, approximately 1 Gbit per second packet switching performance. The single port module 536 therefore can process packet switching on a single port at speeds up to 1 Gbit per second. The multi-port module 518 provides similar aggregate performance but distributes the bandwidth over, preferably, eight ports each operating at speeds, for example, of up to 100 Mbit per second. These aggregated or trunked ports may be seen as a single logical port to the switch.

Each port includes high speed FIFOs for exchanging data over its respective port. Specifically, each port, 520, 528, and 537, preferably includes an inbound FIFO 522, 530, and 538, respectively for receiving packets from the network medium connected to the port. Further, each port 520, 528, and 537, preferably includes a high priority outbound FIFO 524, 532, and 540, respectively, and a low priority outbound FIFO 526, 534, and 542, respectively. The low priority outbound FIFOs are used to queue data associated with transmission of normal packets while the high priority outbound FIFO is used to queue data associated with transmission of control packets. Each module (518 and 536) includes circuits (not specifically shown) to connect its port FIFOs to the switch bus 550.

As packets are received from a port, the packet data is applied to the switch bus 550 in such a manner as to permit monitoring of the packet data by switch control 504. In general, switch control 504 manages access to switch bus 550 by all port modules (i.e., 518 and 536). All port modules "listen" to packets as they are received and applied by a receiving port module to switch bus 550.

It will be appreciated that embodiments of the present invention can be realized in the form of hardware, software, firmware, or any combination thereof. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage medium that are suitable for storing a program or programs that, when executed, for example by a processor, implement embodiments of the present invention. Accordingly, embodiments provide a program comprising code for implementing a system or method as claimed in any preceding claim and a machine readable storage medium storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

What is claimed is:

1. A method for reporting operational information in a network, the network including a network device and a network management server, the method comprising:
   detecting by the network device an event triggering reporting of a modification to a configuration of the network device;
   providing a report message initiated by the network device to the network management server, the report message identifying the modification to the configuration of the network device; and
   committing, by the network device, the modification to the configuration of the network device after providing the report message to the network management server.

2. The method of claim 1, wherein the configuration is comprised of a startup configuration and a running configuration, and wherein modifications to the running configuration are monitored.

3. The method of claim 2, wherein the report message includes the running configuration.

4. The method of claim 2, wherein the report message includes a difference between the running configuration and the startup configuration.

5. The method of claim 2, wherein the report message includes the startup configuration.

6. The method of claim 1, wherein the report message is used by the network management server for troubleshooting a disruption in the network.

7. The method of claim 2, wherein committing the modification further comprises saving the running configuration.

8. A method for reporting operational information in a network, the network including a network device and a network management server, the method comprising:
   detecting, by the network device, an event indicating a performance condition in the network device and a modification to a configuration of the network device;
   generating a report message initiated by the network device identifying the modification to the configuration of the network device and a state of the network device at the time of the event;
   providing the report message to the network management server; and
   committing, by the network device, the modification to the configuration of the network device after providing the report message to the network management server.

9. The method of claim 8, further comprising:
   monitoring a plurality of performance parameters of the network device, wherein the event indicating the performance condition includes determining a performance parameter of the plurality of performance parameters exceeds a threshold.

10. The method of claim 8, wherein the state of the network device includes one or more of memory information of the network device, processor information of the network device, and interface information of the network device.

11. The method of claim 8, wherein the report message includes a technical support file.

12. The method of claim 8, wherein the report message is used by the network management server for troubleshooting a disruption in the network.

13. A non-transitory computer-readable medium storing a plurality of instructions for controlling a data processor of a network device for reporting operational information in a network, the network including the network device and a network management server, the plurality of instructions comprising:
   instructions that cause the data processor to detect an event triggering reporting of a modification to a configuration of the network device;
   instructions that cause the data processor to provide a report message initiated by the network device to the network management server, the report message identifying the modification to the configuration; and
   instructions that cause the data processor of the network device to commit the modification to the configuration of the network device after providing the report message to the network management server.

14. The non-transitory computer-readable medium of claim 13, wherein the configuration is comprised of a startup configuration and a running configuration, and wherein modifications to the running configuration are monitored.

15. The non-transitory computer-readable medium of claim 14, wherein the report message includes the running configuration.

16. The non-transitory computer-readable medium of claim 14, wherein the report message includes a difference between the running configuration and the startup configuration.

17. The non-transitory computer-readable medium of claim 14, wherein the report message includes the startup configuration.

18. The non-transitory computer-readable medium of claim 13, wherein the report message is used by the network management server for troubleshooting a disruption in the network.

* * * * *